(12) United States Patent
Lin (10) Patent No.: US 8,323,772 B2
(45) Date of Patent: Dec. 4, 2012

(54) PHOTON-ALIGNMENT OPTICAL FILM

(75) Inventor: Tien-Tsai Lin, Taipei (TW)

(73) Assignee: S.A.W. Green Technology Corporation, Taipei County (TW)

( * ) Notice: Subject to any disclaimer, the term of this patent is extended or adjusted under 35 U.S.C. 154(b) by 544 days.

(21) Appl. No.: 12/694,286

(22) Filed: Jan. 27, 2010

(65) Prior Publication Data

US 2011/0181958 A1 Jul. 28, 2011

(51) Int. Cl.
*B32B 5/16* (2006.01)
*G02B 1/10* (2006.01)
*G02B 5/02* (2006.01)

(52) U.S. Cl. ........ 428/144; 428/143; 428/148; 428/403; 359/599; 977/775

(58) Field of Classification Search ............... 428/144, 428/148, 143, 403; 977/775; 359/599
See application file for complete search history.

(56) References Cited

U.S. PATENT DOCUMENTS

| | | | |
|---|---|---|---|
| 7,091,271 B2* | 8/2006 | James et al. | 524/430 |
| 7,229,686 B2* | 6/2007 | Yoshikawa et al. | 428/343 |
| 7,771,624 B2* | 8/2010 | Shim et al. | 252/512 |
| 8,076,846 B2* | 12/2011 | Mizuno et al. | 313/512 |
| 2003/0175004 A1* | 9/2003 | Garito et al. | 385/143 |
| 2007/0048462 A1* | 3/2007 | Takebe et al. | 428/1.33 |
| 2009/0169866 A1* | 7/2009 | Ostafin et al. | 428/323 |
| 2010/0112349 A1* | 5/2010 | Su et al. | 428/389 |

* cited by examiner

*Primary Examiner* — William P Watkins, III (74) *Attorney, Agent, or Firm* — Leong C. Lei (57) ABSTRACT

A photon-alignment optical film includes a film substrate on which at least one layer of core/shell nanoparticles is coated. The core/shell nanoparticle layer includes a plastic substance, which is photo curable or heat curable, and a plurality of core/shell nanoparticles, which is uniformly distributed in the plastic substance. Light energy is used as a driving force to induce electrical potential of the same polarity on the surfaces of the core/shell nanoparticles to make the core/shell nanoparticles rearranged in the form of a matrix due to repulsion induced between like electrical polarity. Spacing between the particles, which is relatively constant, allows light to pass therethrough. The plastic substance is cured by light or heat to have the core/shell nanoparticles set in position to thereby form the optical film. Such an optical film features both diffusion and brightness enhancement.

18 Claims, 12 Drawing Sheets

PHOTON-ALIGNMENT OPTICAL FILM

(a) TECHNICAL FIELD OF THE INVENTION

The present invention generally relates to a film structure, and more particularly to a photon-alignment optical film, which employs the characteristics of photo catalysis of core/shell nanoparticles to have molecules uniformly distributed in a plastic substance due to electrical charges of the same electrical property carried on an outer surface of each core/shell nanoparticle induced by electron-hole pairs that are generated by irradiation of the core/shell particles by visible lights and which employs an internal magnetic field to control the spacing between the core/shell nanoparticles, followed by curing of the plastic substance with light or heat to set the core/shell nanoparticles within the coating layer thereby forming the photon-alignment optical film.

(b) DESCRIPTION OF THE PRIOR ART

A Flat Panel Display (FPD) cannot emit light by itself and thus backlighting is needed to provide a light source. Consequently, an optical film plays an important role in the current FPD industry.

The prism technology comprising brightness enhancement film (BEF) comprises a polyester-made optical film on which a UV resin is coated and transfer-printing is then carried out with a roller having a microstructure of pre-casting. This technology shows the following disadvantages: (1) The prism like lens structure is susceptible to the formation of Moiré pattern; (2) Brightness is enhanced in a front view angle, but dark zones, rather than brightness, are formed in side view angles.

3M developed a reflective polarized light brightness enhanced film, commonly referred to as dual brightness enhancement film (DBEF), which uses multi-layer technology to make a structure composed of nearly a thousand of layers having unique characteristics of birefringence, so that most of the S-polarized light (linear polarized light of which the electric field is normal to an incidence surface) that is supposed to be absorbed and thus lost is converted into usable effective P-polarized light (linear polarized light of which the electric field is parallel to the incidence surface) to improve the brightness of a screen. However, it is disadvantageous that the stacking and expansion of a thousand of layers of birefringence requires a high manufacturing costs; the stacking adhesion force and the difference in expansion coefficient makes the formation of popcorn during the manufacturing or use, leading the separation of intermediate layers; and rainbow interference color influences color uniformity.

A Japanese company uses cholesteric liquid crystal (ChLC) and quarter wave film to divide light into two types and employs repeated cycling to provide an effect similar to brightness enhancement. The disadvantages of the cholesteric liquid crystal are (1) formation of elliptical polarization of light so that a phase difference film is needed for further correcting the light to linear polarization of light before it can be used by the liquid crystal; (2) simultaneous effect of R, G, B by the quarter wave film that controls direction, making it difficult to employ the technology of cholesteric liquid crystal and also leading to high costs; and (3) being easily susceptible to temperature change due to the composition of cholesteric liquid crystal.

Another method for enhancing brightness of optical film is also available by using micro-lens diffusion technology. The disadvantages of this method are as follows: (1) Light leaking zones are present between microstructures, which make it not possible to uniformly diffuse light, eventually leading to non-uniform diffusion of light; and (2) the performance of light diffusion is related to radius of curvature and since it is related to the thickness and cannot be increased, leading to poor performance of diffusion.

A further method that employs nano additive diffusion technology to manufactures an optical film is also known. This method has several disadvantages. (1) Different particle sizes cause uneven reflection and refraction with respect to the optical thickness (¼λ), leading to dispersion of light. (2) Materials with small difference in high and low refractive indexes makes the performance of diffusion poor. (3) No light passage is provided, so that light with an angle greater than the critical angle get great loss due to total reflection and thus it provides only optical films of low transmittance.

The following table lists comparison between the known methods:

|  | DBEF | BEF | liquid crystal | micro-lens | nano additive |
| --- | --- | --- | --- | --- | --- |
| principle | a combination of nearly a thousand layers of polymers having unique characters of birefringence | prism lens | cholesteric liquid crystal and quarter wave film | printed micro-lens | addition of nano organic or inorganic particles |
| brightness enhancement | excellent | good | excellent | good | no |
| difference of light | P-polarized light | linear light | elliptic polarization | P-and S-polarized lights | P-and S-polarized lights |
| diffusion of light | no | no | no | good | excellent |
| function of prism | yes | yes | no | yes | no |
| drawbacks | formation of Moiré pattern | formation of Moiré pattern | requiring phase difference film to correct elliptic polarization light into linear polarization | being susceptible to leaking of light, resulting in non-uniform distribution | low light transmittance |

-continued

|  | DBEF | BEF | liquid crystal | micro-lens | nano additive |
|---|---|---|---|---|---|
|  |  |  | light | of light and poor product passing rate |  |
| cost | high | high | high (due to phase difference film) | low | low |

In view of the above description, it is apparent that the existing optical films all show respective drawbacks, which include poor light diffusion, complication of structure, combined use of various optical film, and high costs.

SUMMARY OF THE INVENTION

In view of the fact that the conventional optical films all possess certain drawbacks, the present invention aims to provide a photon-alignment optical film for overcoming such problems.

An objective of the present invention is to provide an optical film comprising core/shell nanoparticles that are arranged in the form of a matrix in such a way that spacing between the core/shell nanoparticles is not greater than several times of wavelength, whereby when the core/shell nanoparticles are of a size greater than the optical thickness of full wavelength of visible lights, light will partially transmit and partially reflect. Both transmitting light and reflected light contain P- and S-polarized lights. The travel paths of the lights are repeatedly changed in direction so as to make the lights diffused.

Another objective of the present invention is that when light travels from a dense medium into a thin medium, the phase of the light is changed by 180 degrees and thus reversed. The phase of transmitting light remains the same, but the reflected light, once subjected to reflection again, is changed to be in phase and the in-phase light passes through the gap passages. In-phase lights from different zones are overlapped to thus enhance the brightness of light.

A further objective of the present invention is that with multiple times of reflection and refraction of light, a fraction of the P-polarized light and the S-polarized light are converted into P-polarized light and this allows most of the S-polarized light, which is often lost due to being absorbed, to be converted into P-polarized light that can be used by liquid crystal.

A further objective of the present invention is that when core/shell nanoparticles have a size less than full wavelength of visible light, light will not be reflected and thus provide high transmittance and further, the core/shell nanoparticles are of semi-conductivity, and will become excellent in electrical conduction in a lighting environment, thereby providing the characteristics of anti-static.

Yet a further objective of the present invention is that a center point of the core/shell nanoparticle forms a Poisson spot, where lights from different zones are added due to the same phase to thereby greatly improve the illumination of light, providing a function of convergence similar to a positive lens and providing direction correction for straightforward traveling light when close to the shortest distance of light emission.

A further objective of the present invention is to provide a photon-alignment optical film, which utilizes the characteristics of catalysis provided by the core/shell nanoparticles. When the core/shell nanoparticles are subjected to light irradiation, pairs of electron and hole having opposite charges and equal electricity are generated. When an external magnetic field is applied, according to Hall Effect, the electrons and the holes are acted upon by Lorentz forces in different directions and thus are respectively gathered in different directions. An electric field is thus established between the gathered electrons and holes. The surfaces of the particles all carry the same polarity. Since there is no conductive wire on the surfaces, no current is induced. According to Lenz's law, here an electric field of electrical current will be induced and according to Ampere's theorem, a magnetic field is also generated, the electric field and the magnetic field being normal to each other and of the same phase and traveling beyond the bond of material to freely prorogate as waves. Within the magnetic field, an electromagnetic force is in action and thus changes the status of the core/shell nanoparticles within a fluid. When all the particles share the same polarity on the surfaces thereof, to cancel the magnetic field between the particles, a new magnetic field is generated, and magnetic pressure induced within the magnetic field causes the particles to move in opposite directions. Such a stress tensor is a second order (r=2) tensor. Thus, the core/shell nanoparticles will reach a distribution in the form of a matrix. This allows the particles to uniformly distribute within an ultraviolet organic plastic material in the form of matrix and the particle, after being subjected to irradiation of light, are set within the organic plastic substance to form a photon-alignment optical film.

To achieve the above objectives, the present invention provides a photon-alignment optical film, which comprises a film substrate on which at least one layer of core/shell nanoparticles is coated, wherein the core/shell nanoparticle layer comprises a plastic substance and a plurality of core/shell nanoparticles. The plastic substance forms a layer like structure and the plurality of core/shell nanoparticles is uniformly distributed in the plastic substance. The plurality of core/shell nanoparticles uses light energy as a driving force for alignment so as to realize matrix like uniform distribution within the organic plastic substance. Further, the plastic substance is curable for setting the core/shell nanoparticles within the plastic substance to form the photon-alignment optical film.

With the above described technology, the above mentioned photon-alignment optical film comprising a core/shell nanoparticle layer shows at least six types of efficacies including high transmittance, anti-static, diffusion, brightness enhancement, effective utilization of light, and correction of travel direction of light. Since a product of the photon-alignment optical film can be done in a single process simply by light irradiation for alignment and ultraviolet irradiation or heating for curing, the manufacturing costs are low and the throughput is high, leading to the advantages of low cost and high market competition power. Thus, the photon-alignment optical film according to the present invention offers the following advantages: (1) anti-static function, (2) transmittance enhancing function, (3) function of high diffusion and high penetration, (4) brightness enhancing function by photocycle overlapping, (5) function of effective utilization of light (polarization), and (6) function of correcting travel direction of light.

Each of the core/shell nanoparticles comprises a core and a shell. The core comprises a photo-catalyst. The shell encloses the core and comprises a metal oxide or organic or inorganic complex metal oxide having one more valence or one less valence than the photo-catalyst.

The core of the core/shell nanoparticles is made of a material selected from a group consisting of $ZrO_2$, ZnO, $WO_3$, $TiO_2$, TiO, and $TiO_2$, and $TiO_{2-x}N_x$. The shell is made of a material selected from a group consisting of zinc oxide, magnesium oxide, magnesium stearate, and zinc stearate.

Each of the core/shell nanoparticles uses light as a driving force to make surfaces of the core/shell nanoparticles carrying identical electrical property so as to make the core/shell nanoparticles forming a uniform matrix-like distribution through repulsion induced by like electrical charges.

Each of the core/shell nanoparticles uses light and magnetic field as driving forces to make surfaces of the core/shell nanoparticles carrying identical electrical property so as to make the core/shell nanoparticles forming a uniform matrix-like distribution through repulsion induced by like electrical charges.

The plastic substance comprises heat-curable plastic substance. The plastic substance comprises a photo-curable plastic substance. The film substrate is selected from a group consisting of an organic polymer film made of polyethylene terephthalate (PET), polycarbonates (PC), cyclo olefin copolymer (COC), or triallyl cyanurate (TAC), glass, and metal.

A fraction of the core/shell nanoparticles protrude beyond a surface of the plastic substance.

The core/shell nanoparticles are distributed in the plastic substance.

Two layers of core/shell nanoparticles are provided and respectively formed on opposite surfaces of the film substrate, of which one of the layers comprises core/shell nanoparticles having a size greater than optical thickness of full wavelength of visible light and the other layer comprises core/shell nanoparticles having a size less than the optical thickness of full wavelength of visible light.

Three layers of core/shell nanoparticle layer are provided on the film substrate, two of the three layers being stacked and coated on one surface of the film substrate, the remaining layer being coated on an opposite surface of the film substrate. The two stacked layer comprise a lower layer comprising core/shell nanoparticles having a size greater than optical thickness of full wavelength of visible light and an upper layer stacked on the lower layer and comprising core/shell nanoparticles having a size less than the optical thickness of full wavelength of visible light. The layer coated on the opposite surface of the film substrate comprises core/shell nanoparticles having a size less than the optical thickness of full wavelength of visible light.

The plastic substance comprises a heat-curable organic polymer.

The plastic substance comprises a photo-curable organic polymer.

Two layers of core/shell nanoparticles are provided and sequentially coated on a surface of the film substrate, comprising a lower layer comprising core/shell nanoparticles having a size greater than optical thickness of full wavelength of visible light and an upper layer, which is located outside the lower layer, comprising core/shell nanoparticles having a size less than the optical thickness of full wavelength of visible light.

Two layers of core/shell nanoparticles are provided and respectively coated on opposite surfaces of the film substrate. Both layers comprise core/shell nanoparticles having a size less than optical thickness of full wavelength of visible light.

Two layers of core/shell nanoparticles are provided and respectively coated on opposite surfaces of the film substrate. Both layers comprise core/shell nanoparticles having a size greater than optical thickness of full wavelength of visible light.

A single layer of core/shell nanoparticles is provided and coated on a surface of the film substrate.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-4, a photon-alignment optical film 1 constructed in accordance with the present invention, generally designated at 1, comprises generally a film substrate 10 on which a layer 11 of core/shell nanoparticles is coated.

Figure 1:
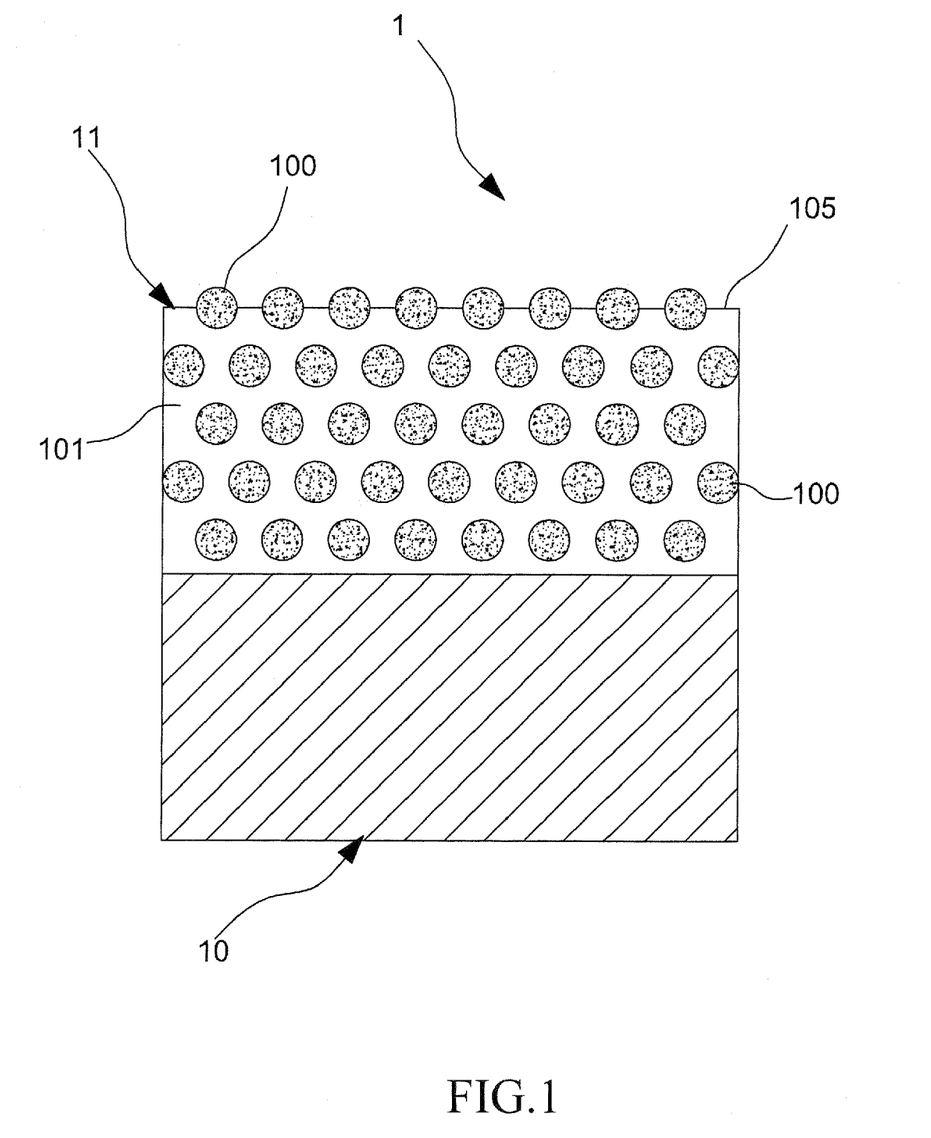
FIG. 1 is a cross-sectional view of the present invention.

The film substrate 10 is formed of an organic polymer film made of for example polyethylene terephthalate (PET), polycarbonates (PC), cyclo olefin copolymer (COC), and triallyl cyanurate (TAC), or glass, or metal.

The core/shell nanoparticle layer 11 comprises a heat-curable or photo-curable plastic substance 101 and a plurality of core/shell nanoparticles 100.

The heat-curable or photo-curable plastic substance 101 forms a layer like structure and may comprise an organic polymer plastic substance.

The plurality of core/shell nanoparticles 100 is uniformly distributed in the heat-curable or photo-curable plastic substance 101, so as to form the core/shell nanoparticle layer 11, as illustrated in FIG. 1.

Figure 2:
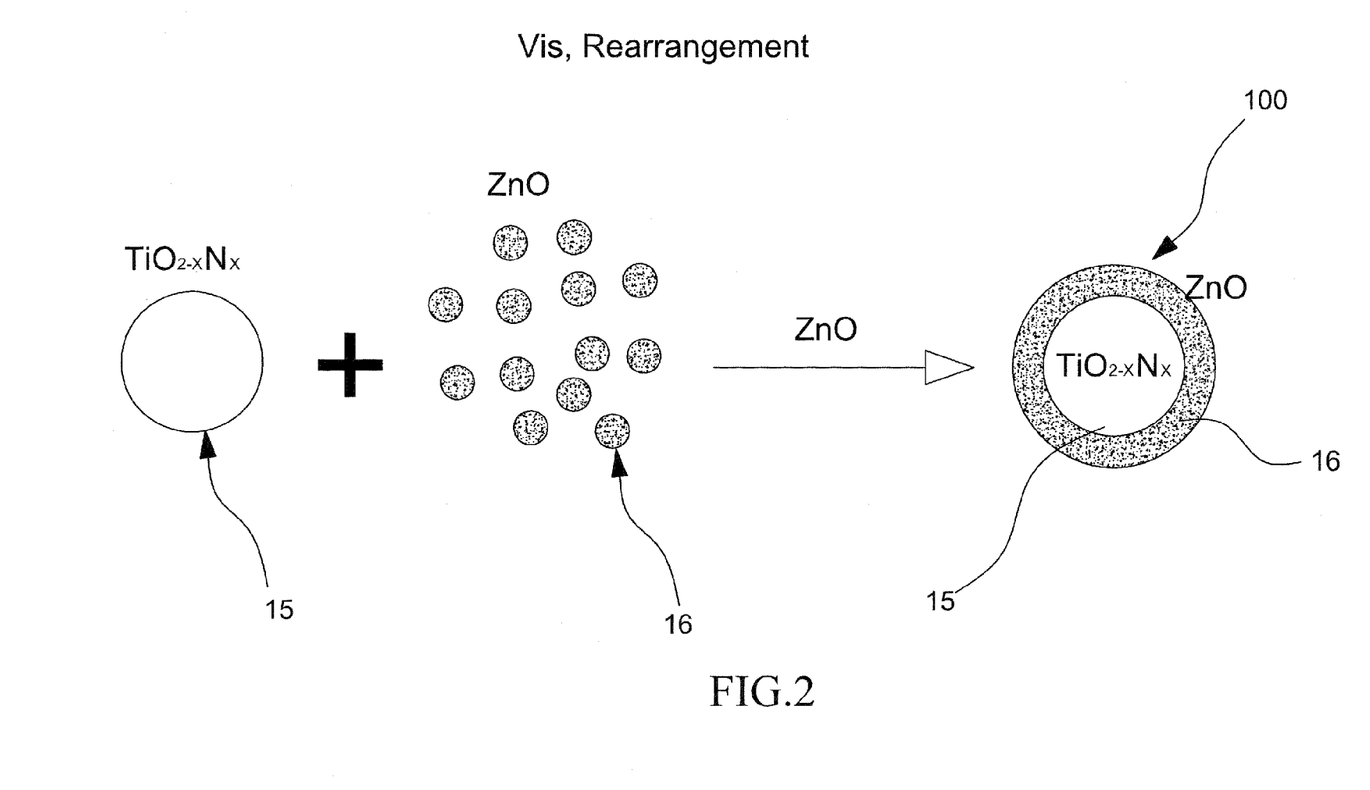
FIG. 2 illustrates the formation of core/shell nanoparticle according to the present invention.

A method for synthesizing the core/shell nanoparticles 100 (which may also be referred to as core/shell photo-catalyst) generally comprises a synthesis process for making core/shell structure of inorganic or organic particles, wherein a sol-gel method is employed to form core/shell nanoparticles 100 of uniform size. The core/shell nanoparticles 100 comprise a core 15 and a shell 16.

The core 15 comprises a photo-catalyst ($TiO_{2-x}N_x$), which can be any one of $ZrO_2$, $ZnO$, $WO_3$, $TiO_2$, $TiO$, and $TiO_{2-x}N_x$.

The shell 16 encloses an outside surface of the core 15 and can comprises a metal oxide or organic or inorganic complex metal oxide having one more valence or one less valence than the photo-catalyst and being particularly one of zinc oxide (ZnO), magnesium oxide, magnesium stearate, and zinc stearate, as shown in FIG. 2. Further, the core/shell nanoparticles 100 can be of a size of approximately the optical thickness of an associated wavelength and the size can be increased or decreased as required. The term "optical thickness" as used herein is defined as follows:

optical thickness=($\frac{1}{4}$)λ÷(refractive index of material)

For example: for λ=800 nm (the longest wavelength for visible light), the optical thickness (nm)=800 nm×($\frac{1}{4}$)÷(refractive index)

Taking $TiO_2$ with a refractive index value of 2.43 as an example, the optical thickness is 83 nm according to the above listed formula.

In a preferred embodiment, the heat-curable or photo-curable plastic substance 101 induces change in volume (such as contraction or expansion) when subjected to heat or irradiation of light and shows a sufficient rate of volume change so as to make a fraction of the core/shell nanoparticles 100 protruding a surface 105 of the plastic substance 101 to form bead-like projections.

Figure 3:
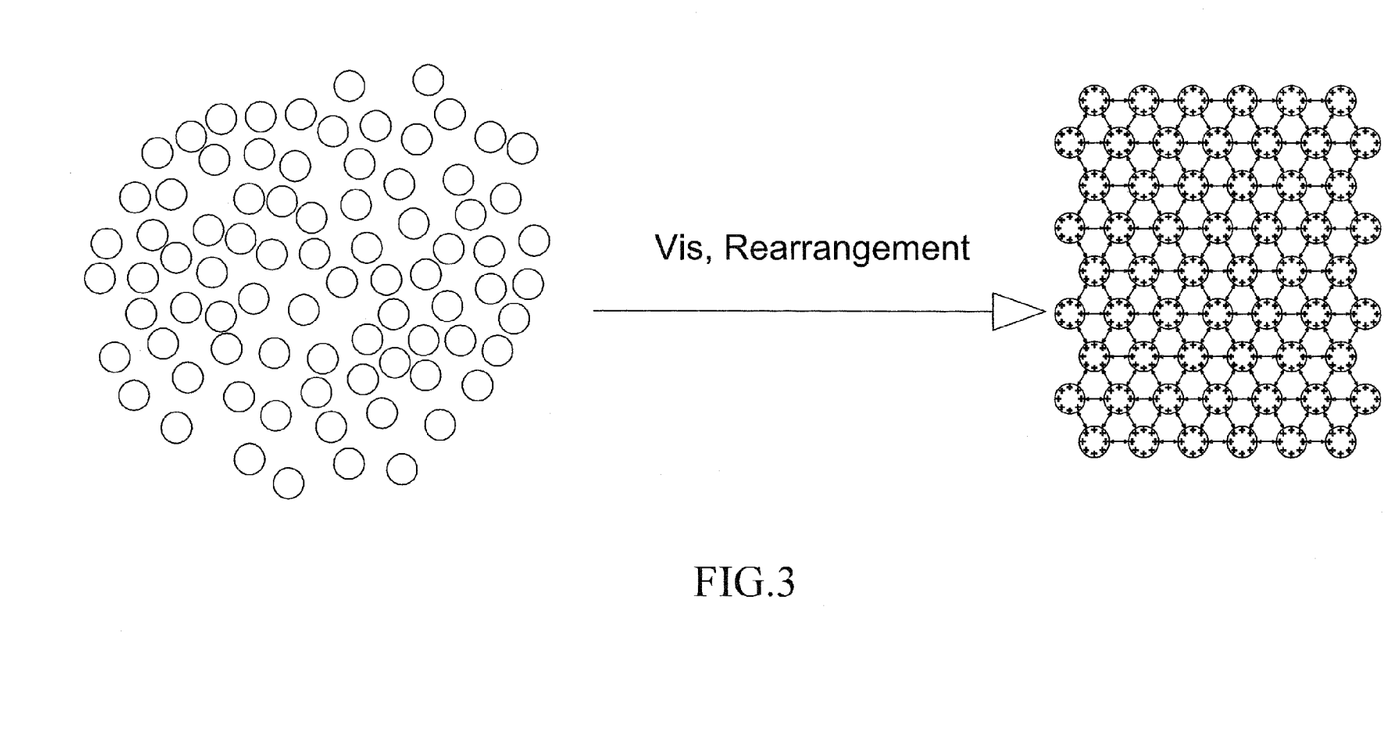
FIG. 3 illustrates the rearrangement of the core/shell nanoparticles according to the present invention when irradiated by light.

The present invention uses the characteristics of photo-catalysis of the core/shell nanoparticles 100 to make each core/shell nanoparticle 100, after being subjected to irradiation of visible light (Vis, FIGS. 2 and 3), generating electron-hole pairs, whereby the core/shell nanoparticles 100 carry electrical charges of the same electrical property on the surface thereof (FIG. 4), leading to the result of "repulsion between like charges" that make rearrangement of core/shell nanoparticles 100 in the form of a matrix. As such, the core/shell nanoparticles 100 are uniformly distributed in the heat-curable or photo-curable plastic substance 101 in a matrix-like arrangement, as shown in FIG. 3. The heat-curable or photo-curable plastic substance 101 can be photo-curable (by irradiation of ultraviolet light) or a heat-curable plastic substance 101 (either organic or inorganic plastic substance), which get cured when subjected to irradiation by ultraviolet light. Further, the heat-curable or photo-curable plastic substance 101 shows the characteristics of solution with respect to the core/shell nanoparticles 100 and is thus considered and treated like a solution.

Further, the cores 15 (photo-catalyst) of the core/shell nanoparticles 100 comprises titanium dioxide ($TiO_{2-x}N_x$), which has applications in the products/industries of antibacterial action, deodorization, and sterilization and also finds application in the products of photo-catalyst, anti-ultraviolet agent, and agent for photovoltaic effect.

Reference is further made to FIGS. 1-5, with proper disposition of heat-curable or photo-curable plastic substance (solution) 101 containing core/shell nanoparticles 100, a precision coating process for photon alignment can be carried out and the performance of the process will be described as follows.

Figure 5:
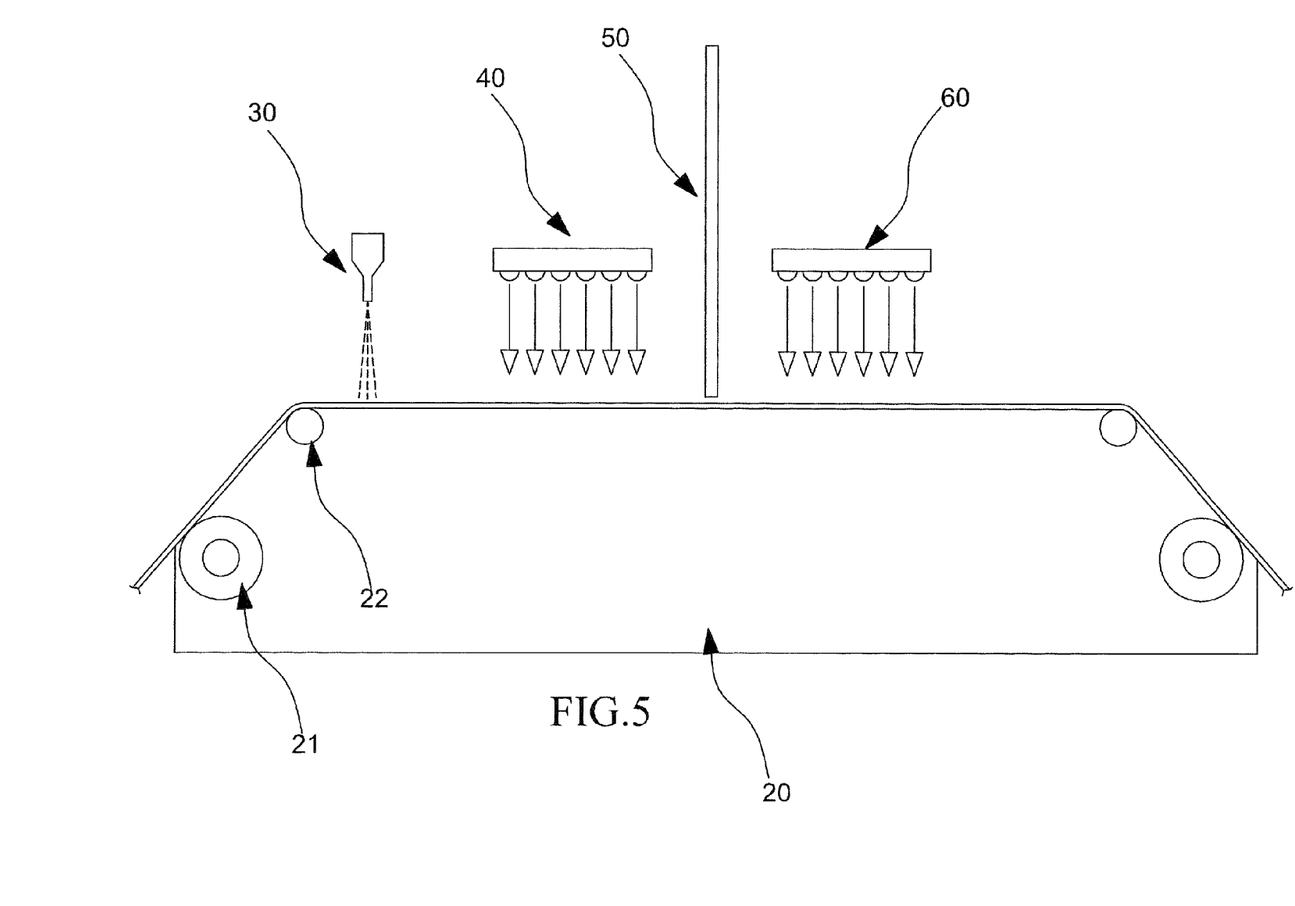
FIG. 5 is a schematic view illustrating a manufacturing process according to the present invention.

Firstly, the precision coating process for photon alignment is carried out with a coating application machine 20, which comprises a plurality of rollers 21, 22, whereby a film substrate 10 is conveyed forward by means of the rollers 21, 22.

The plastic substance (solution) 101 that contains core/shell nanoparticles 100 as described above is applied and sprayed to the film substrate 10 by a precision coating application nozzle 30 arranged on the coating application machine 20 so as to form a layer 11 of core/shell nanoparticles on the film substrate 10. The core/shell nanoparticle layer 11 may have a thickness of about 5 μm.

The film substrate 10 that is coated with the core/shell nanoparticle layer 11 is continuously conveyed through a visible light irradiation device 40. The visible light irradiation device 40 irradiates visible light to the core/shell nanoparticle layer 11, making the core/shell nanoparticles 100 contained therein inducing electrical charges of the same electrical property and thus forming a uniform matrix-like rearrangement.

Figure 7:
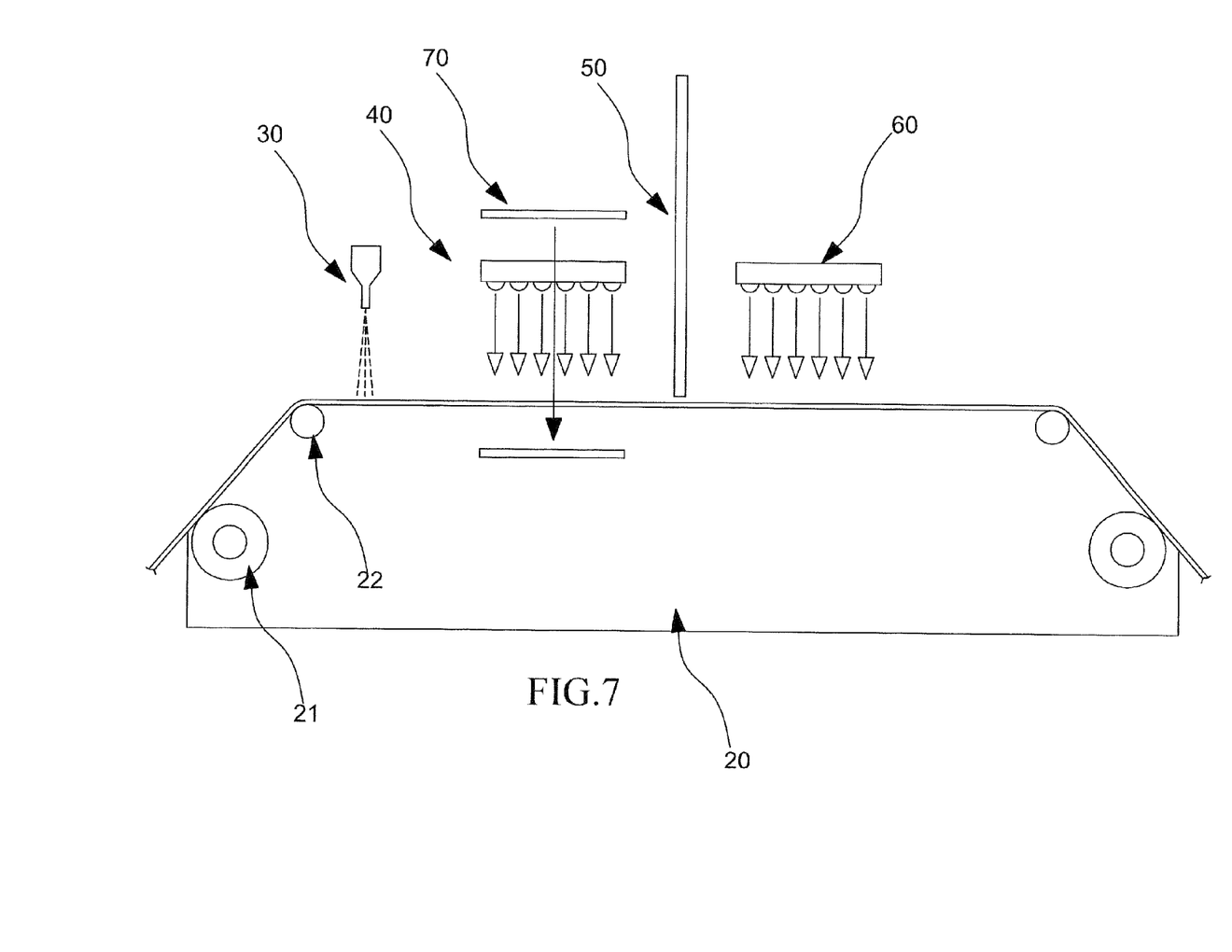
FIG. 7 is a schematic view illustrating another manufacturing process according to the present invention.

Afterwards, the film substrate 10 is conveyed under a light shielding board 50, and then passes through an ultraviolet light irradiation device 60. The ultraviolet light irradiation device 60 irradiates ultraviolet light to the core/shell nanoparticle layer 11 to cure and set the core/shell nanoparticle layer 11. For proper control of the matrix of the core/shell nanoparticles 100, as shown in FIG. 7, in performance of photon alignment, a magnetic field 70 is further added so that the core/shell particles 100 are exposed to a uniform magnetic field, which generates displacement energy by magnetic moment, U=−m·B ("U" being energy having a unit of joule; "m" standing for magnetic moment having a unit of ampere·square meter; "B" being magnitude of magnetic field). Changing the externally imposed energy by the magnetic field changes allows for modification of the displacement energy for realizing optimum operation of the optical film.

After the above described process of curing and setting, a product of the photon-alignment optical film 1 according to the present invention is completed.

Figure 6:
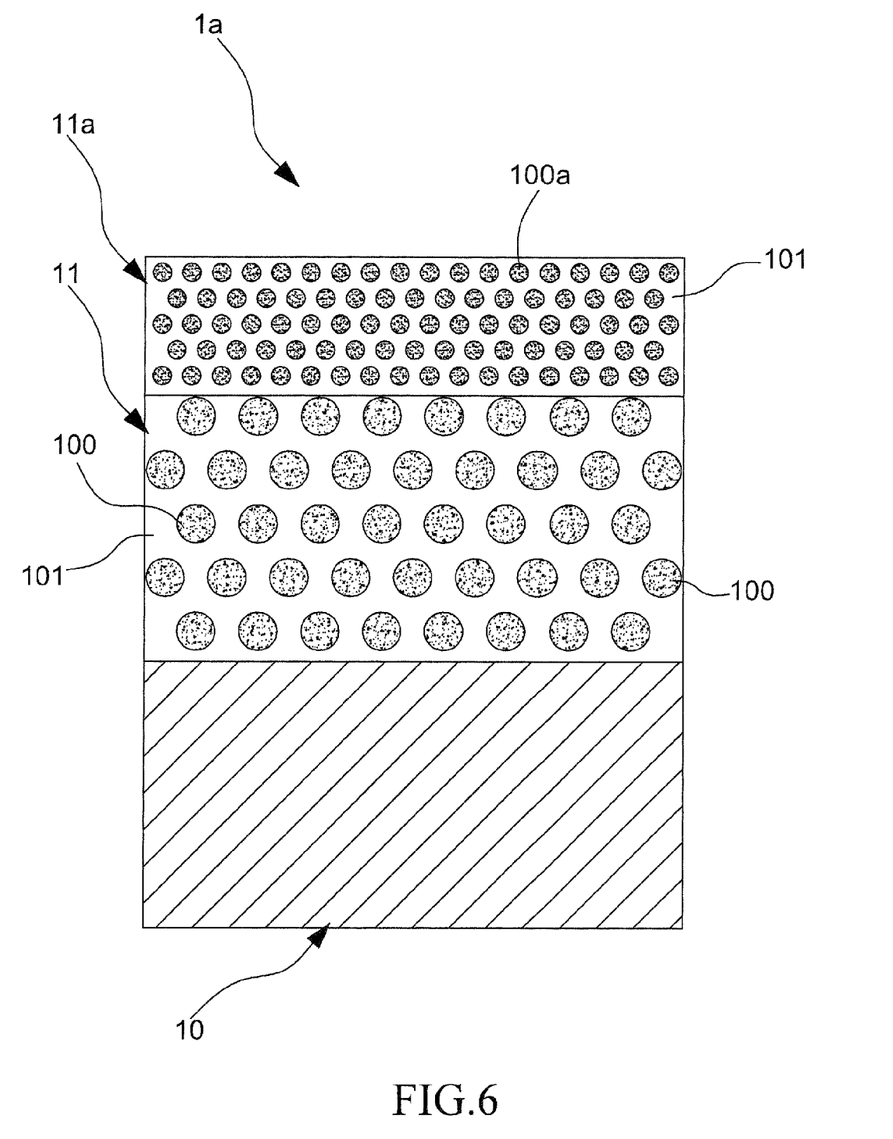
FIG. 6 is a cross-sectional view illustrating a first modified embodiment according to the present invention.

Referring to FIG. 6, in a first modified embodiment according to the present invention, a photon-alignment optical film, generally designated at 1a, comprises two layers 11, 11a of core/shell nanoparticles and the two core/shell nanoparticle layers 11, 11a are applied to sequentially coat on the same surface of a film substrate 10 with a lower layer 11 of the core/shell nanoparticles containing core/shell nanoparticles 100 (referred hereinafter to as "minor particles") having a size greater than the optical thickness of full wavelength of visible light. The minor core/shell nanoparticles 100 provide functions of light diffusion or brightness enhancement. For anti-reflection or anti-static purposes, the upper layer, namely the outer layer 11a, of the core/shell nanoparticles contains core/shell nanoparticles 100a (referred hereinafter to as "major particles") having a size less than the optical thickness of full wavelength of visible light.

Figure 8:
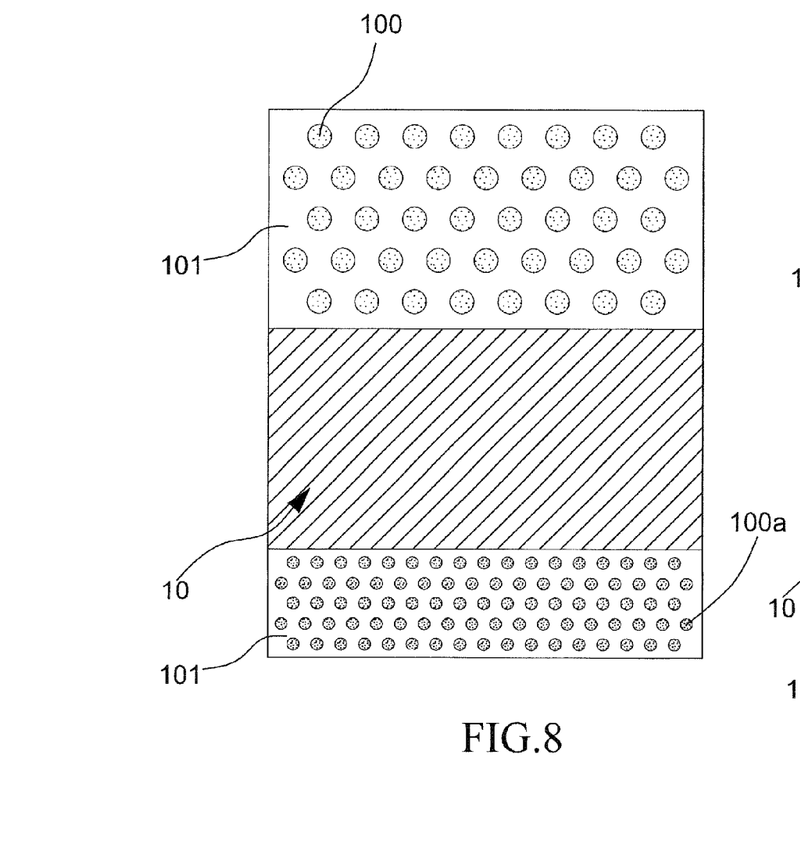
FIG. 8 is a cross-sectional view illustrating a second modified embodiment according to the present invention.
Figure 9:
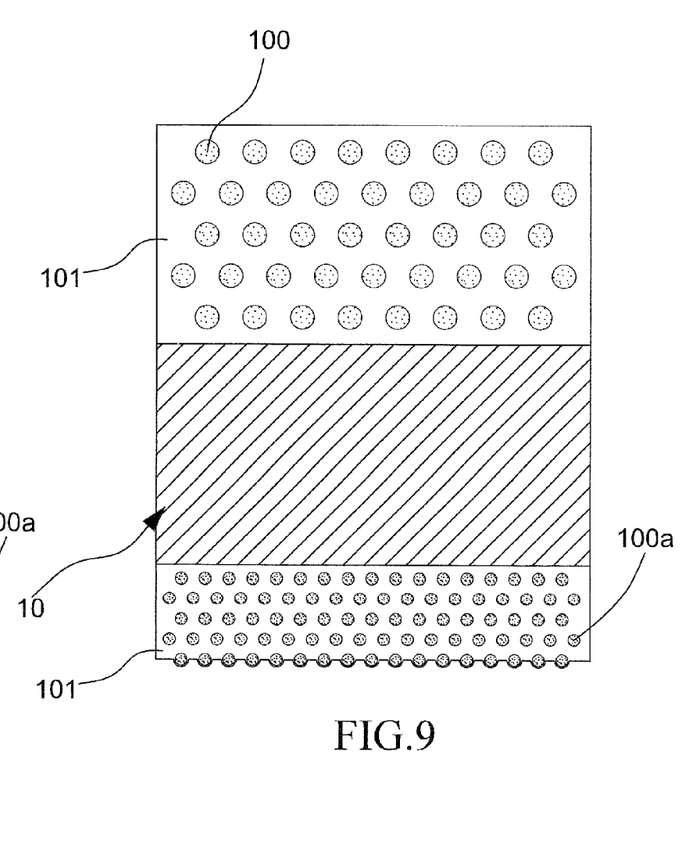
FIG. 9 is a cross-sectional view illustrating a third modified embodiment according to the present invention.

Referring to FIGS. 8 and 9, second and third modified embodiments of the photon-alignment optic film according to the present invention are shown, both comprising a structure having two layers of core/shell nanoparticles that are arranged opposite to each other, wherein the photon-alignment optical films according to the present invention comprises two layers 11 of core/shell nanoparticle and the two core/shell nanoparticle layers 11 are respectively coated on opposite surfaces of a film substrate 10. One of the core/shell nanoparticle layers contains minor core/shell nanoparticles 100a, while the other layer contains major core/shell nanoparticles 100. In the third modified embodiment, a fraction of the minor core/shell nanoparticles 100a are made protruding beyond an outer surface of the core/shell nanoparticle layer thereof.

Figure 10:
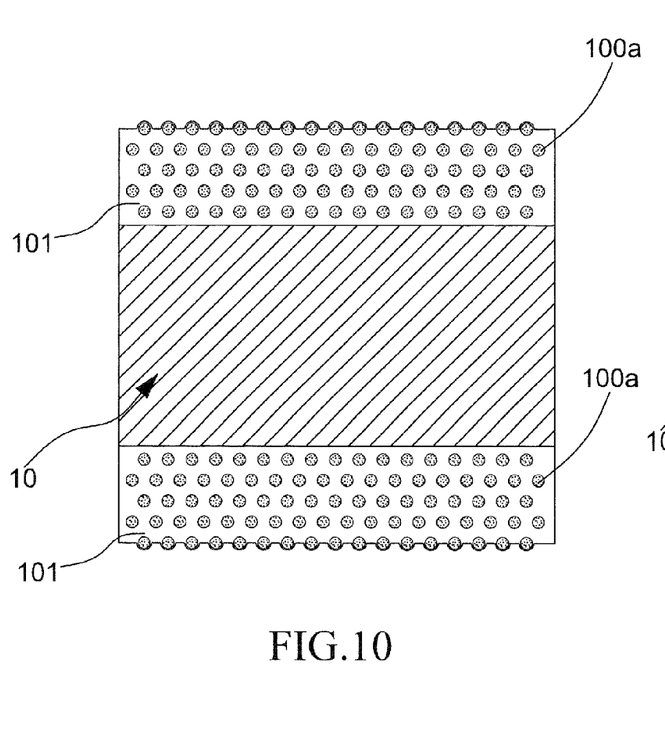
FIG. 10 is a cross-sectional view illustrating a fourth modified embodiment according to the present invention.
Figure 11:
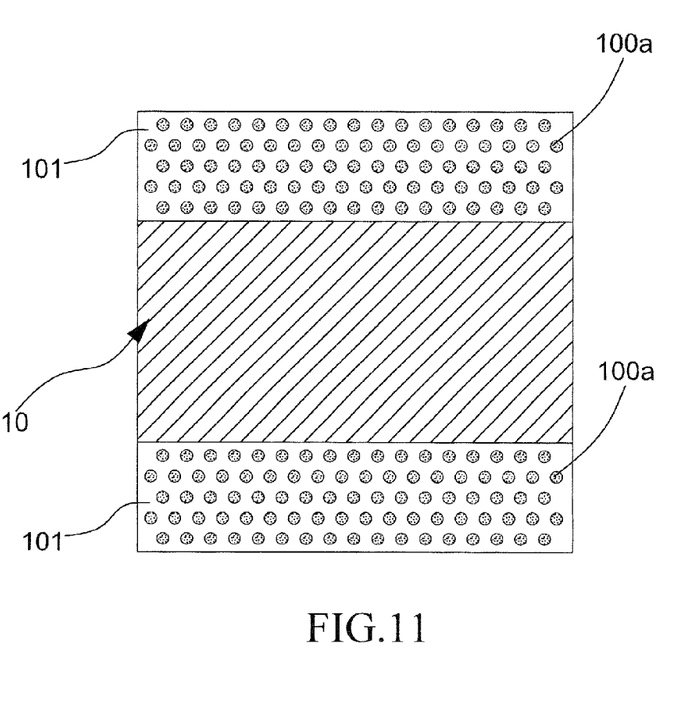
FIG. 11 is a cross-sectional view illustrating a fifth modified embodiment according to the present invention.

Referring to FIGS. 10 and 11, fourth and fifth modified embodiments of the photon-alignment optic film according to the present invention are shown, which, similar to the second modified embodiment discussed previously, comprise a structure having two oppositely arranged layers of core/shell nanoparticles. However, in these two embodiments, the two core/shell nanoparticle layers on the two surfaces both contain minor core/shell nanoparticles 100a, and a fraction of the minor core/shell nanoparticles 100a is allowed to selectively protrude beyond a surface of the associated core/shell nanoparticle layer.

Figure 12:
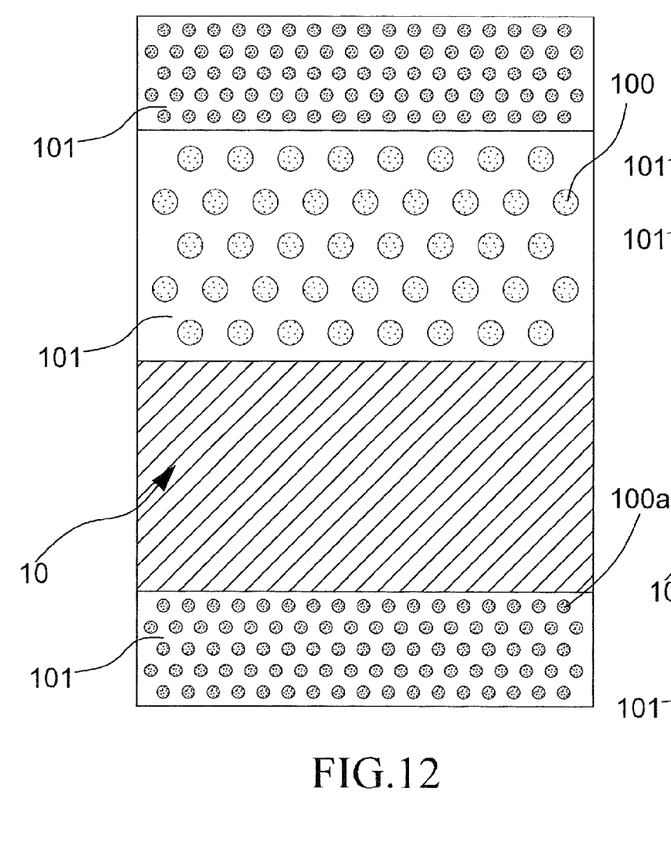
FIG. 12 is a cross-sectional view illustrating a sixth modified embodiment according to the present invention.
Figure 13:
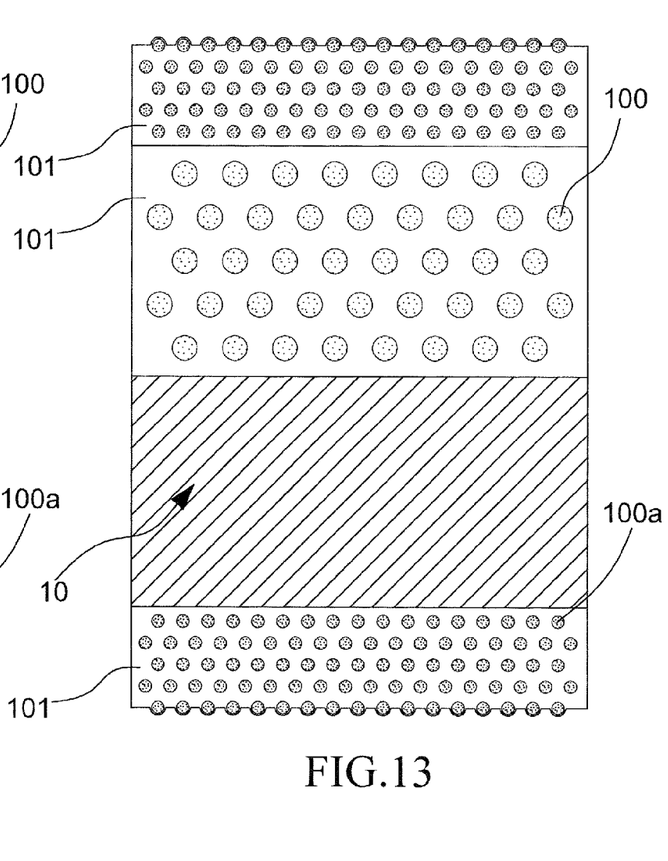
FIG. 13 is a cross-sectional view illustrating a seventh modified embodiment according to the present invention.

Referring to FIGS. 12 and 13, sixth and seventh modified embodiments of photon-alignment optical film according to the present invention are shown, wherein a layer of core/shell nanoparticle (comprising minor core/shell nanoparticles 100a) is arranged on a surface of a film substrate 10 and two stacked layers of core/shell nanoparticle (respectively comprising major core/shell nanoparticles 100 and minor core/shell nanoparticles 100a) are provided on an opposite surface of the film substrate 10. A fraction of the minor core/shell nanoparticles 100a is allowed to selectively protrude beyond an outer surface of the associated core/shell nanoparticle layers.

Figure 14:
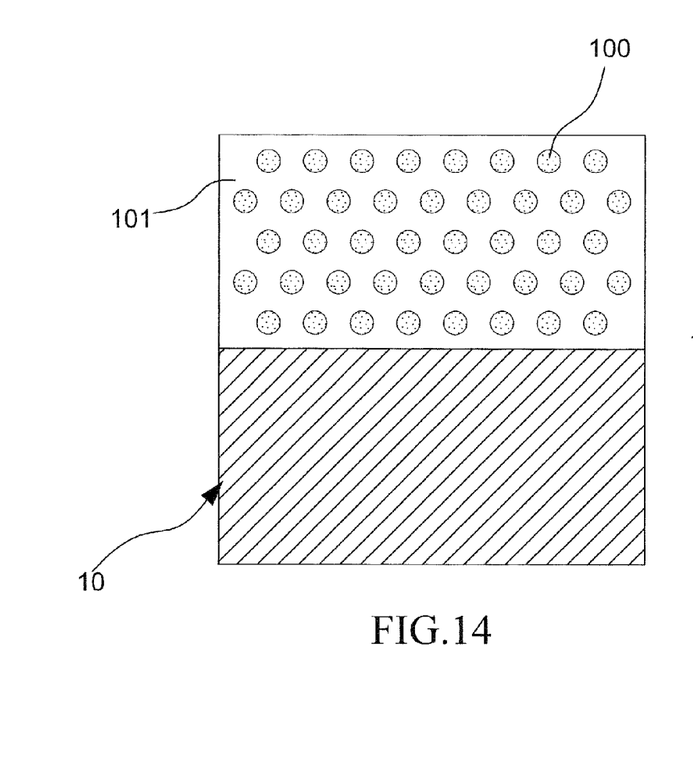
FIG. 14 is a cross-sectional view illustrating an eighth modified embodiment according to the present invention.
Figure 15:
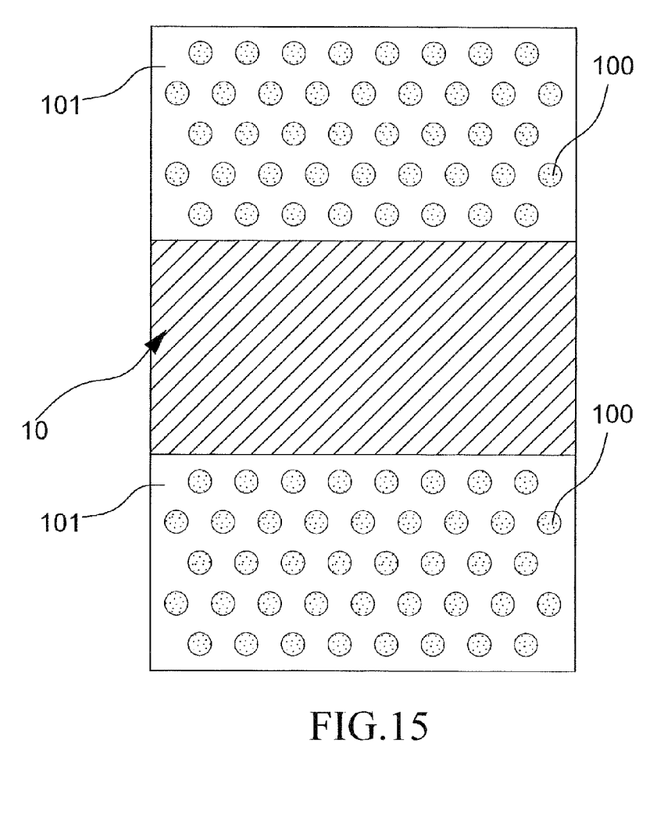
FIG. 15 is a cross-sectional view illustrating a ninth modified embodiment according to the present invention.

Referring to FIGS. 14 and 15, eighth and ninth modified embodiments of photon-alignment optical film according to the present invention are shown, which respectively comprise structures having a single layer of core/shell nanoparticle and two layers of core/shell nanoparticle both containing major core/shell nanoparticles 100.

Figure 16:
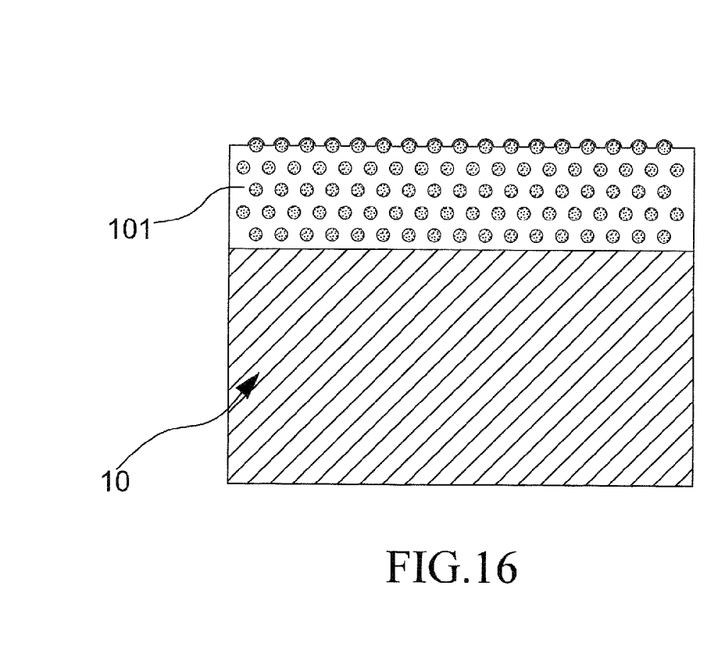
FIG. 16 is a cross-sectional view illustrating a tenth modified embodiment according to the present invention.
Figure 17:
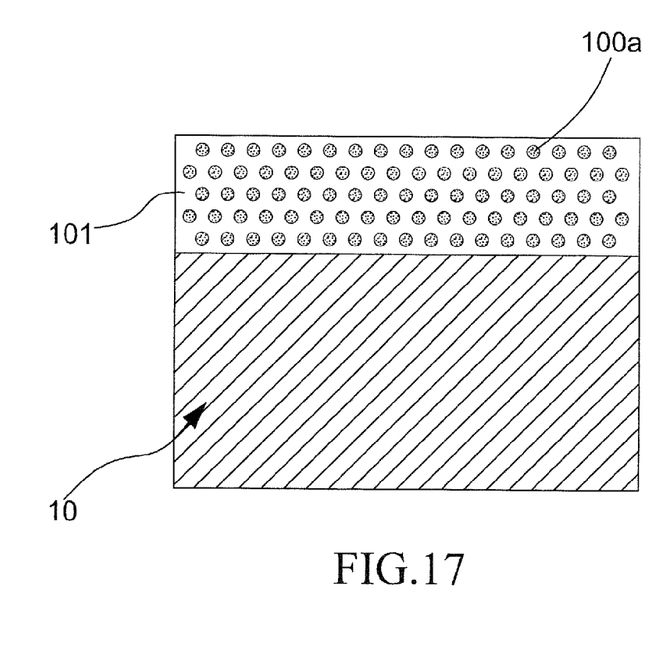
FIG. 17 is a cross-sectional view illustrating an eleventh modified embodiment according to the present invention.

Referring to FIGS. 16 and 17, tenth and eleventh modified embodiments of photon-alignment optical film according to the present invention are shown, which comprise structures having a single layer of core/shell nanoparticle containing minor core/shell nanoparticles 100a.

An explanation of photon alignment realized through the present invention will be given with the following description of applications of a visible light irradiation device.

When the core/shell nanoparticles 100 are subjected to light irradiation, pairs of electron and hole having opposite charges and equal electricity are generated. When an external magnetic field is applied, according to Hall Effect, the electrons and the holes are acted upon by Lorentz forces in different directions and thus are respectively gathered in different directions. An electric field is thus established between the gathered electrons and holes. In quantum electrodynamics, according to Maxwell's Equations, with the variation of time, the electric field induces a magnetic field and vise versa. Thus, an oscillating electric field generates an oscillating magnetic field and the oscillating magnetic field in turns generates an oscillating electrical filed. As such, the successively generated oscillating electric and magnetic fields collectively form an electromagnetic wave that goes beyond the bond of material to freely prorogate as waves. When all the particles share the same polarity on the surfaces thereof, to cancel the magnetic field between particles, a new magnetic field is generated (Lenz's law), and magnetic pressure induced within the magnetic field causes the particles to move in opposite directions. Such a stress tensor is a second order (r=2) tensor. Thus, at a given time point, the core/shell particles will reach a uniform matrix like distribution.

Figure 4:
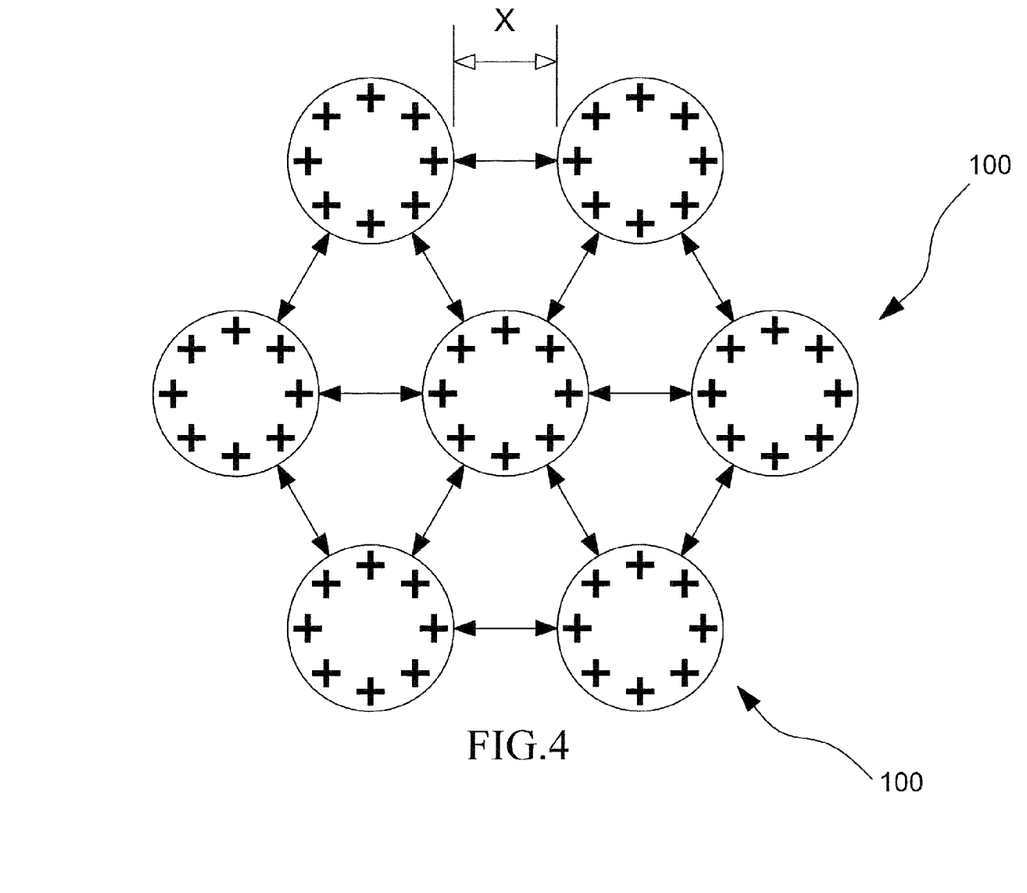
FIG. 4 illustrates the core/shell nanoparticles according to the present invention carrying identical potential.

When the core/shell nanoparticles 100 perform rearrangement to form a matrix after being irradiated by visible light, the matrix of the core/shell nanoparticles 100 forms therein gaps X through which light may pass, as shown in FIG. 4. When the size of the core/shell nanoparticles 100 is greater than the optical thickness of the full wavelength of visible light, reflected light within the visible light range will be repeatedly reflect to pass through the gaps X, and the travel directions of reflected light and refracted light are changed. When the travel path of the light is repeatedly changed, the light is diffused. When the reflected light travels from a denser medium into a thinner medium and is subjected reflection again, the phase of the light is changed 180 degrees and the light that is subjected to reflection again and thus be in phase with the refracted light, will meet the light passing through the gap X thereby increasing the chance of light overlapping. When the incidence angle of light gets greater than the critical angle, total reflection occurs and changes the travel path of light, inducing passing loss of light. Due to the passage formed by the gap X, since different materials have refractive indexes and thus difference critical angles, effectiveness resembling expansion of critical angle can be achieved to reduce the passing loss of light caused by total reflection. Further, due to the overlapping of light, brightness of light is enhanced.

In the above matrix like arrangement of core/shell nanoparticles 100, when the size of the core/shell nanoparticles 100 is smaller than the optical thickness of the full wavelength of the visible light, since light diffracts about a round obstacle having a size less than the wavelength, a bright spot (Poisson spot) will be formed behind the round obstacle, lights from different zones are added and strengthened because of being in phase, leading to greatly intensified illumination of the light. This is just like the function of convergence of a positive lens and thus provides a function of correction of light. When the round obstacle is smaller than an optical thickness 400 nm, the visible light will not be reflected, meaning no reflection occurs. Since variation of light components only occurs in case of light reflection, for example, a fraction of P-polarized light being reflected and turned into S-polarized light, when P-polarized light passes the present invention, no decomposition into P- and S-polarization lights will occurs and thus, polarization components of the light do not change so that it can serve as the best choice for upward diffusion.

With the above described technology, the above mentioned photon-alignment optical film 1, 1a, 1b that comprises a core/shell nanoparticle layer 11, 11a shows at least six types of efficacies including transmittance, diffusion, brightness enhancement, correction of travel direction of light, effective utilization of light (polarization), and anti-static. Since a product of the photon-alignment optical film 1, 1a, 1b can be done simply by light irradiation and photo setting, the manufacturing costs are low and the throughput is high, leading to the advantages of low cost and high market competition power. Further, the photon-alignment optical film according to the present invention also offers the following advantages: (1) anti-static, (2) enhancing transmittance, (3) high diffusion and high penetration, (4) photocycle overlapping that provides enhanced brightness, (5) reducing passing loss of light caused by total reflection, and (6) inducing no change to polarized components passing through Poisson spot.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A photon-alignment optical film, comprising a film substrate on which at least one layer of core/shell nanoparticles is coated, the core/shell nanoparticle layer comprising a plastic substance and a plurality of core/shell nanoparticles, the plurality of core/shell nanoparticles being uniformly distributed in the plastic substance in the form of a matrix by using light energy as a driving force for alignment, the plastic substance being photo curable or heat curable for setting the core/shell nanoparticles within the plastic substance to form the photon-alignment optical film.

2. The photon-alignment optical film according to claim 1, wherein each of the core/shell nanoparticles comprises a core and a shell, the core comprising a photo-catalyst, the shell enclosing the core and comprising a metal oxide or organic or inorganic complex metal oxide having one more valence or one less valence than the photo-catalyst.

3. The photon-alignment optical film according to claim 2, wherein the core of each of the core/shell nanoparticles is made of a material selected from a group consisting of $ZrO_2$, $ZnO$, $WO_3$, $TiO_2$, $TiO$, and $TiO_{2-x}N_x$ and wherein the shell is made of a material selected from a group consisting of zinc oxide, magnesium oxide, magnesium stearate, and zinc stearate.

4. The photon-alignment optical film according to claim 3, wherein each of the core/shell nanoparticles uses light as a driving force to make surfaces of the core/shell nanoparticles carrying identical electrical property so as to make the core/shell nanoparticles forming a uniform matrix-like distribution.

5. The photon-alignment optical film according to claim 3, wherein each of the core/shell nanoparticles uses light and magnetic field as driving forces to make surfaces of the core/shell nanoparticles carrying identical electrical property so as to make the core/shell nanoparticles forming a uniform matrix-like distribution.

6. The photon-alignment optical film according to claim 1, wherein the plastic substance comprises heat-curable plastic substance.

7. The photon-alignment optical film according to claim 3, wherein the plastic substance comprises a photo-curable plastic substance.

8. The photon-alignment optical film according to claim 1, wherein the film substrate is selected from a group consisting of an organic polymer film made of polyethylene terephthalate (PET), polycarbonates (PC), cyclo olefin copolymer (COC), or triallyl cyanurate (TAC), glass, and metal.

9. The photon-alignment optical film according to claim 1, wherein a fraction of the core/shell nanoparticles protrude beyond a surface of the plastic substance.

10. The photon-alignment optical film according to claim 3, wherein the core/shell nanoparticles are distributed in the plastic substance.

11. The photon-alignment optical film according to claim 3, wherein two layers of core/shell nanoparticles are respectively formed on opposite surfaces of the film substrate, of which one of the layers comprises core/shell nanoparticles having a size greater than optical thickness of full wavelength of visible light and the other layer comprises core/shell nanoparticles having a size less than the optical thickness of full wavelength of visible light.

12. The photon-alignment optical film according to claim 3, wherein three layers of core/shell nanoparticle layer are provided on the film substrate, two of the three layers being stacked and coated on one surface of the film substrate, the remaining layer being coated on an opposite surface of the film substrate, the two stacked layer comprising a lower layer comprising core/shell nanoparticles having a size greater than optical thickness of full wavelength of visible light and an upper layer stacked on the lower layer and comprising core/shell nanoparticles having a size less than the optical thickness of full wavelength of visible light, the layer coated on the opposite surface of the film substrate comprising core/shell nanoparticles having a size less than the optical thickness of full wavelength of visible light.

13. The photon-alignment optical film according to claim 3, wherein the plastic substance comprises a heat-curable organic polymer.

14. The photon-alignment optical film according to claim 3, wherein the plastic substance comprises a photo-curable organic polymer.

15. The photon-alignment optical film according to claim 3, wherein two layers of core/shell nanoparticles are sequentially coated on a surface of the film substrate, comprising a lower layer comprising core/shell nanoparticles having a size greater than optical thickness of full wavelength of visible light and an upper layer, which is located outside the lower layer, comprising core/shell nanoparticles having a size less than the optical thickness of full wavelength of visible light.

16. The photon-alignment optical film according to claim 3, wherein two layers of core/shell nanoparticles are respectively coated on opposite surfaces of the film substrate, both layers comprising core/shell nanoparticles having a size less than optical thickness of full wavelength of visible light.

17. The photon-alignment optical film according to claim 3, wherein two layers of core/shell nanoparticles are respectively coated on opposite surfaces of the film substrate, both layers comprising core/shell nanoparticles having a size greater than optical thickness of full wavelength of visible light.

18. The photon-alignment optical film according to claim 1, wherein the core/shell particles are first subjected to visible light alignment and is then subjected to ultraviolet irradiation or heating for curing and setting to form the optical film.

* * * * *